United States Patent [19]
Alex

[11] Patent Number: 5,836,106
[45] Date of Patent: Nov. 17, 1998

[54] PLANT WATERING CONTROL DEVICE

[76] Inventor: Timothy Scott Alex, 62 Woodvale Ave., Greenville, S.C. 29605

[21] Appl. No.: 792,636

[22] Filed: Jan. 31, 1997

Related U.S. Application Data

[63] Continuation-in-part of Ser. No. 243,826, May 17, 1994, abandoned.

[51] Int. Cl.⁶ .................................................. A01G 27/00
[52] U.S. Cl. ............................................................. 47/48.5
[58] Field of Search ........................................ 47/48.5, 79

[56] References Cited

U.S. PATENT DOCUMENTS

| | | | |
|---|---|---|---|
| 3,125,255 | 3/1964 | Kaiser | 47/79 X |
| 3,797,738 | 3/1974 | Fitzhugh | 47/48.5 X |
| 4,060,934 | 12/1977 | Skagge | 47/79 |
| 4,089,133 | 5/1978 | Duncan | 47/48.5 |
| 4,117,685 | 10/1978 | Skaife | 47/48.5 X |
| 4,753,394 | 6/1988 | Goodman | 47/48.5 X |
| 5,009,028 | 4/1991 | Lorenzana et al. | 47/79 X |
| 5,259,142 | 11/1993 | Sax | 47/48.5 |
| 5,493,811 | 2/1996 | Tobias et al. | 47/79 |
| 5,568,701 | 10/1996 | Haigler | 47/48.5 |

FOREIGN PATENT DOCUMENTS

| | | | |
|---|---|---|---|
| 601788 | 7/1960 | Canada | 47/48.5 |
| 1493474 | 9/1967 | France | 47/48.5 |
| 2469870 | 6/1981 | France | 47/79 |
| 122349 | 7/1901 | Germany | 47/48.5 |
| 139663 | 4/1903 | Germany | 47/48.5 |

*Primary Examiner*—John A. Ricci
*Attorney, Agent, or Firm*—John M. Harrington; Kilpatrick Stockton LLP

[57] ABSTRACT

A plant watering system utilizing an improved plant watering device to provide automatic, controlled delivery of liquid, such as water, fertilizer and insecticides, to the root systems of a plurality of plants on a substantially continuous basis. The plant watering system includes an enclosed chamber or tubing with multiple openings and a plurality of improved plant watering devices adapted to be attached to the openings. The improved plant watering device includes an internally threaded endcap which is attached to externally threaded members extending from the openings for securely attaching the tubing to the plant watering device and forming an airtight connection between the endcap and the extension member. Further, the preferred embodiment of the plant watering device includes a resilient washer positioned in the threaded endcap at the top end for ensuring an airtight fit between the endcap and the extension member. In an alternative embodiment, the plant watering system includes a large water storage container and tubing with a plurality of openings and T-shaped fittings for connecting the tubing to the improved plant watering devices. The self-regulating plant watering system of the subject invention is easily assembled and readily utilized for automatically watering a plurality of plants on an as needed basis, depending on the requirements of each individual plant.

21 Claims, 5 Drawing Sheets

PLANT WATERING CONTROL DEVICE

This is a continuation-in-part application of application Ser. No. 08/243,826 filed May 17, 1994, now abandoned.

BACKGROUND OF THE INVENTION

1. Field of the Invention

This application relates to plant watering devices and, more particularly, to a novel indoor and outdoor plant watering spike for long term plant watering control.

2. Description of the Related Art

In the growing and maintenance of small plants and agricultural plantings there is a need to provide water or applicable nourishing liquid to the root system of a plant in a controlled manner on a substantially continuous basis and in correct amounts. This allows the particular plant to feed itself as needed, without the damaging effects of over watering. In order to avoid the disadvantages associated with manual watering, various "automatic" watering systems are known in the prior art. One such method of accomplishing proper watering of a plant within a conventional planting pot is through the use of a structure which facilitates transfer of liquid from a liquid reservoir to the plant by means of capillary action. Such capillary action watering structures are shown in Farnham U.S. Pat. No. 2,281,068; Keskitulo U.S. Pat. No. 2,554,302; Barstow U.S. Pat. No. 2,695,474; and Longacre U.S. Pat. No. 2,865,137. As problems developed with vacuum buildup, air flow and clogging of feed tubes, various devices have been proposed for solving these problems. For example, see Rohling U.S. Pat. No. 3,856,205; Duncan U.S. Pat. No. 4,089,133; Chen U.S. Pat. No. 4,970,823; Costa U.S. Pat. No. 4,991,346 and Sax U.S. Pat. No. 5,259,142. However, none of these patents have been able to successfully overcome all of the problems involved.

Typically, a conventional planting pot includes a floor having a centrally located aperture which serves as a drain hole when the plant has been over watered. The surrounding side wall can include vents adjacent to the floor and spaced from the drain hole. It is typical for such a planting pot to be placed on the interior of a larger outer container or pot which may be either used to contain excess watering liquid that the potting soil cannot contain or be used as a liquid reservoir for the supply of irrigating liquid. therein.

It is generally considered to be harmful to place the planting pot within an outer container or pot such that the lower portion of the planting pot is submerged within the supply of water or irrigating liquid maintained within the outer container, either through design or drain off. The result could be an over-watering which can virtually drown and kill the plant, or result in root rot, which will have the same effect. It is desirable however, to position the root system in fluid communication with a supply of water and nutrients that become available to the root system on a required basis only. Therefore, proper watering, as needed, is automatically accomplished through the plants requirements facilitated through capillary action of the surrounding soil, in conjunction with a properly controlled transfer vehicle.

SUMMARY OF THE INVENTION

The invention is an improved plant watering device comprising an enclosed water source or water storage chamber and a hollow elongated tubular spike, said spike having an open upper end which is adapted for attachment to a complementary opening in the water storage chamber, said spike having a tapered lower end for insertion beneath the plant soil to a required minimum depth and said lower end terminating in a closed tip portion with one or more openings positioned in said tapered lower end, the openings being located preferably in a position substantially near the midpoint of the tapered lower end for controlled water transfer responsive to soil moisture changes, said openings not exceeding about 7/64 inches (0.105 am.) in diameter.

A modification of the subject invention involves utilizing the improved plant watering device in a plant watering system to provide automatic, controlled delivery of liquid, such as water, fertilizer and insecticides, to the root systems of a plurality of plants on a substantially continuous basis. Plants are typically transported by truck and may be transported great distances to be sold in other markets. For example, it is typical to transfer potted plants from North Carolina to Arizona. However, without proper watering, plants often die while being transported over long distances or if left in the truck for long periods of time. The self-regulating plant watering system of the subject invention is easily assembled and readily utilized for automatically watering a plurality of plants on an as needed basis, depending on the requirements of each individual plant, regardless of whether the plants are planted in individual containers or stored in multiples, such as in a flower box. Thus, the self-regulating watering system is ideal for providing water on a continuous basis, as needed, to plants being transported by trucks. Another ideal use for the system of the subject invention is to provide water and other liquid nourishment, such as fertilizer, to plants stored in greenhouses or nurseries.

In the preferred embodiment, the plant watering system includes an elongated chamber or tubing which includes a plurality of openings at spaced intervals along the length of the tubing and an entrance with a fill cap for receiving water into the tubing from an external source. The tubing has sealed opposite ends and may be manufactured in lengths to accommodate stationary plant beds in greenhouses or transport racks for truck transportation. The plant watering system also includes a plurality of watering devices which are attached to the tubing at the openings. The openings include a means for attaching the watering devices and providing an airtight connection between the tubing and the devices. In the preferred embodiment, each opening is surrounded by an externally threaded extension member for securely attaching the watering devices thereto.

The improved plant watering device for use with the plant watering system of the subject invention includes an elongated, hollow body having an upper portion and a lower portion. The upper portion of the body has an open top end and the lower portion of the body has a closed, tapered bottom end for insertion into the soil. The closed, tapered bottom end includes at least one through hole near the bottom end for allowing a controlled release of liquid from the device into the soil. The through hole is sized to allow liquid to flow from the device through capillary action in response to soil moisture changes. If the surrounding soil is adequately watered, no liquid will be released from the device. In the preferred embodiment, the device includes two through holes opposite from one another near the bottom end and not exceeding approximately 7/64 inches in diameter. While one through hole may be sufficient, the inclusion of two through holes allows liquid to be drawn from the device in both directions which is more efficient for the plant.

In addition, the improved plant watering device of the preferred embodiment may include a plurality of markings or rings on the exterior of the body of the device, spaced at a suitable distance apart, such as, by way of example, one inch apart. Depending on the soil depth and size of the plant, the user may adjust the length of the plant watering device by cutting the device at one of the rings. After cutting the device at one of the rings, the threaded endcap is simply pushed in place at the cut end of the body of the device.

In the preferred embodiment, the open top end of the improved plant watering device includes an internally threaded endcap which is screwed onto the externally threaded member of the tubing for securely attaching the tubing to the plant watering device and forming an airtight connection between the endcap and the extension member. In addition to securing the device to the tubing, the threaded endcap is designed to correspond to the threaded mouth of a typical plastic bottle and the like, such that the plant watering device may be secured and form an airtight connection with a bottle or other enclosed water storage container having a threaded mouth. Further, the preferred embodiment of the plant watering device includes a resilient washer positioned in the threaded endcap at the top end for ensuring an airtight fit between the endcap and the extension member. The washer is a feature of the subject invention and is preferably constructed of a soft, pliable material, such as, by way of example, a rubber material. While various washers were tested, none of the prior art washers could be utilized to ensure an airtight connection for creating a partial vacuum necessary for the proper, continuous, long term function of the device. The resilient, rubber washer of the subject invention is specifically designed for use in the improved plant watering device to ensure an airtight connection between the internally threaded endcap of the watering device and a corresponding externally threaded member of an enclosed water storage container. Thus, the subject invention provides an improved watering device which includes an enclosed chamber for storing water and ensures an airtight and secure connection between the watering device and the chamber which is necessary for creating a partial vacuum therein for proper and long-term operation of the device.

None of the prior art discloses an airtight device having a threaded endcap for receiving the threaded end of an enclosed water storage chamber and securely screwing the device and chamber together in an airtight connection as disclosed in the subject invention. The airtight fit of the preferred embodiment is further ensured by the inclusion of a washer in the threaded endcap. While the fit between the threaded endcap of the watering device and threaded member of the tubing is airtight, the device of the subject invention is easily removed from the tubing by unscrewing it. In contrast, other closure devices, such as a stopper, may net provide an airtight enclosure if not properly and precisely sized. For example, a stopper that is too small will allow air to escape and defeat the operation of a watering apparatus dependent upon the creation of a partial vacuum or, alternatively, a stopper that is too large may not be inserted or may be extremely difficult to remove. None of the prior art teaches use of a partial vacuum and discloses an airtight connection between an enclosed water storage vessel and a watering device which provides a self-regulating plant watering to provide an improved, self-regulating plant watering device.

In use, the plant watering devices of the subject invention are screwed into place on each of the extension members and the tapered bottom ends of the devices are inserted to a desired depth into the soil of the plants. The fill cap is removed from the tubing and the tubing and devices are filled with water. Once the tubing and watering devices are filled with water and the threaded cap is tightly secured, a partial vacuum is created within the tubing. As the soil dries and the plants use the water, air bubbles travel up through the through hole in the bottom end of the device, through the device and into the tubing. When the air bubbles enter the tubing, the partial vacuum is broken and more water is forced out through the through hole. This process repeatedly occurs in each watering device until the tubing is empty and must be refilled with water.

The size of the chamber or diameter of the tubing may be selected by the user, depending on the intended use of the particular plant watering system. For example, a three inch plastic tubing may be used for a flower box, such as a typical flower box ranging in size from thirty inches to forty-eight inches in length. For situations requiring a larger capacity of stored water, such as transportation of numerous plants, a four to six inch tubing may be used. The number of openings and corresponding number of plant watering devices may be varied depending on the number of plants to be watered by the system.

In the preferred embodiment, the tubing and watering devices are constructed of a substantially rigid plastic to prevent air pressure from collapsing the tubing and providing a watering device which is easily pushed partially into the ground and extends vertically upward. The plastic tubing is preferably a clear or transparent plastic so that the amount of water remaining in the tubing is readily determined and can be replenished when depleted. Because the water is delivered below the surface and only on an as needed basis, the watering system minimizes the amount of liquids needed to properly water and maintain a plurality of plants, thus promoting water conservation.

In another embodiment, the plant watering system provides liquid on a long-term basis to a plurality of plants in an exterior setting, such as a garden. The system includes a large water container, such as a water drum, attached to a line or tubing which includes a plurality of openings for attaching a plurality of plant watering devices as described above. The drum must be placed in at position which is slightly elevated above the level of the tubing such that the effects of gravity are exerted on the water column stored in the drum. The drum includes an entrance for receiving water into the drum from an outside source and an exit line to one end of the tubing for delivering the water stored in the drum to the tubing. The exit line includes a means for opening and closing the line, such as an on/off valve, for containing or releasing liquid from the drum, as needed. In this embodiment, the tubing is a hard, plastic hose which runs from the water drum to the last plant in the line and includes a plurality of openings for attaching the plant watering devices. At each opening, a T-shaped fitting, such as a PVC T, is placed on the hose and is attached to another, short plastic hose. The short plastic hose is attached to the T-shaped fitting at one end with its terminal end attached to the top end of the plant watering device which is inserted into the soil adjacent to the plant. The top end of the plant watering device is adapted to be received into the end of the short hose and form a snug fit with the hose.

In use, the plant watering system of the subject invention provides an enclosed, self-regulating water system operating under a partial vacuum for delivering liquid directly to the root systems of a plurality of plants. With the valve leading to the tubing in the closed position, the drum is filled with water and a partial vacuum is created once the entrance is sealed. When the valve is opened, the tubing and plant watering devices fill with water and the vacuum is temporarily broken. Once the tubing and devices are filled with water, the partial vacuum is restored. As the plant uses the water and the soil dries, air bubbles travel up through the through hole in the bottom end of the watering device, through the tubing and into the drum. When the air bubbles enter the drum, the partial vacuum is broken and more water is forced out through the through holes of the devices. This process repeats itself until the drum has to be refilled with water. Because the water is being delivered below the ground surface, there is no evaporation and water is conserved. In addition, smaller amounts of water are necessary, notwithstanding the elimination of water evaporation, because water is not sprayed into the air across a large area, as seen in typical exterior watering systems, but is delivered directly to the root systems of the plants. Likewise, smaller amounts of fertilizer and insecticides are necessary because the nutrients and/or chemicals are fed directly to the root systems.

The foregoing and other features, aspects, and advantages of the present invention will become better understood with regard to the following description, appended claims and accompanying drawings.

DESCRIPTION OF THE PREFERRED EMBODIMENTS

Figure 1:
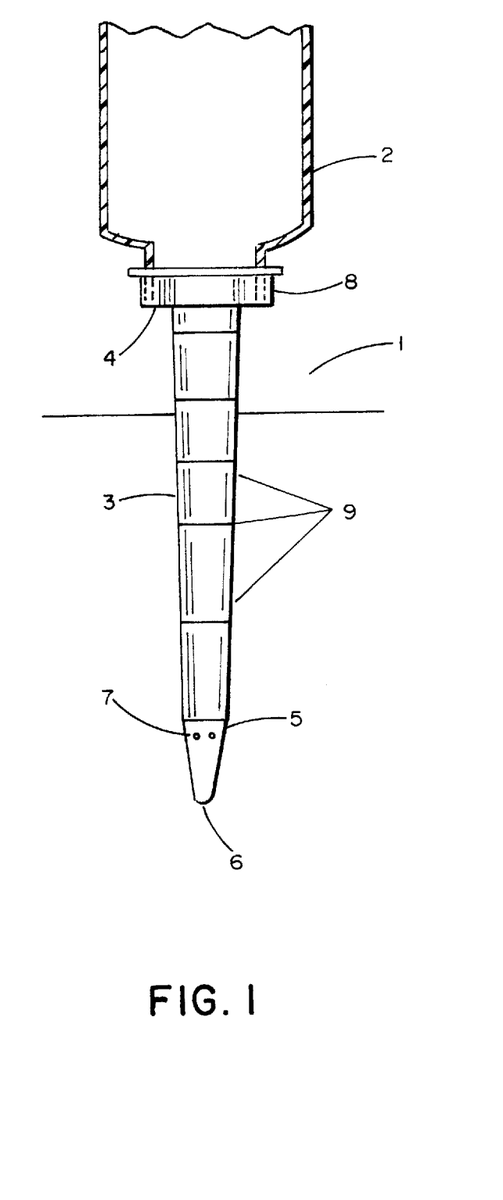
FIG. 1 is a side elevational view of one embodiment of the invention which includes a portion of a typical water storage bottle.

In FIG. 1 watering device 1 is shown with enclosed water storage chamber 2 positioned on top of hollow elongated spike 3 and being attached thereto at upper end 4 of spike 3. Spike 3 has tapered lower end 5 with closed tip 6. Positioned in tapered lower end 5 are one or more openings 7, preferably in a more or less round configuration substantially near the middle portion of tapered end 5. Upper end 4 of elongated spike 3 terminates in threaded receptacle 8 which permits storage chamber 2, which in FIG. 1 is in the form of a common household plastic bottle, to be attached. For convenience in use elongated spike 3 is marked with rings 9 spaced at any suitable distance apart, for example 1 inch (2.54 cm.). This enables the user to adjust elongated spike 3 to any desired length depending on the soil depth of the plant to be watered. After cutting upper end 4 at one of rings 9, threaded receptacle 8 is simply pushed in place at upper end 4 of elongated spike 3. Storage chamber 2 can be any plastic or material in common container capable of retaining a partial vacuum such as a plastic soda bottle or any other type of bottle which will attach to threaded receptacle 8.

Figure 2:
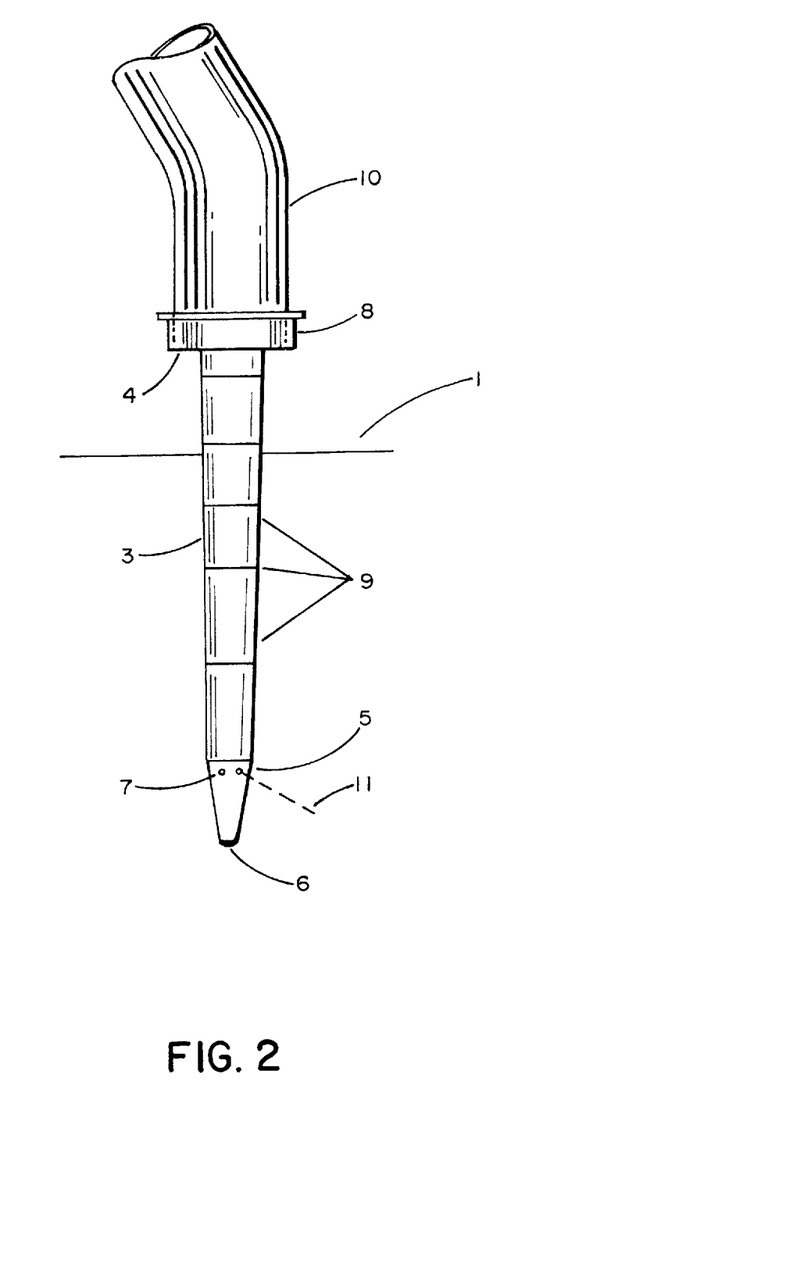
FIG. 2 is a second embodiment of the invention showing an alternative water source and an optional wick insert.

FIG. 2 illustrates a second embodiment of the invention where storage chamber 2 is replaced by an alternative water source as shown here and designated as supply hose 10. Wick 11 is inserted through a pair of openings 7 in tapered lower end 5.

The watering device of the invention provides the user with a highly adaptable and versatile means of watering and feeding plants, it can be used indoors or outdoors for almost any size plant for its initial growth period or for long term maintenance by adjusting the length of elongated spike 3. Water storage and availability is virtually limitless. In indoor use any size an shape bottle from about 4 ounces to about 1 liter or more can be used, preferably with wick 11 inserted. In outdoor use supply hose 10 when attached to a series of elongated spikes 3 permits multiples plant watering and feeding. When elongated spike 3 is inserted into the ground, the liquid flows from chamber 2 such as a bottle until this flow is stopped by the reduced pressure inside the bottle. The ground and roots in contact with the small openings 7 remove the liquid through capillary and wicking action and reduce the surface tension across openings 7. This is possible only because of the small size of openings 7, being about 7/64 inches in diameter. It has been found that openings larger than about this size cause the flow rate to be too fast for proper control. The controlled rate allows small air bubbles into chamber 2, which reduces the partial vacuum inside chamber 2 and allows more liquid to flow until the flow is again stopped by the reduced pressure. Thus, at the times that the ground around the tip dries out, liquid flows from the bottle and is supplied to the ground and the surrounding plants. Elongated spike 3 can also be attached to an array of tubing represented by supply hose 10 for controlling, interior or exterior, agricultural watering, fertilizing and the control of systemic insecticides and water conservation. Through capillary and wicking action, liquid is controlled and delivered to the root system from a reservoir maintaining a partial vacuum on the exterior of the plant.

Figure 3:
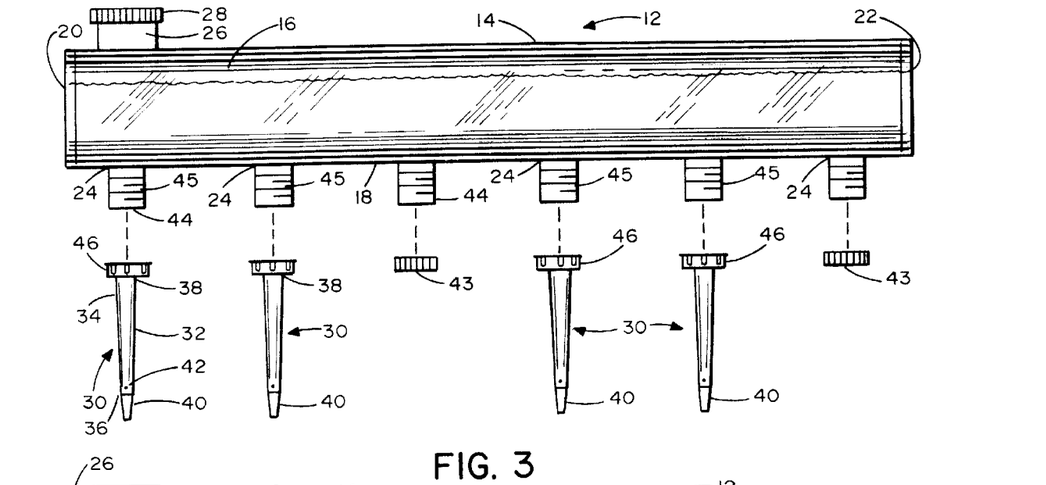
FIG. 3 is a side view of the plant watering system of the subject invention showing the transparent tubing including a threaded fill cap, sealed opposite ends, a plurality of externally threaded extension members and a plurality of improved plant watering devices to be attached to the members and inserted into the soil.
Figure 4:
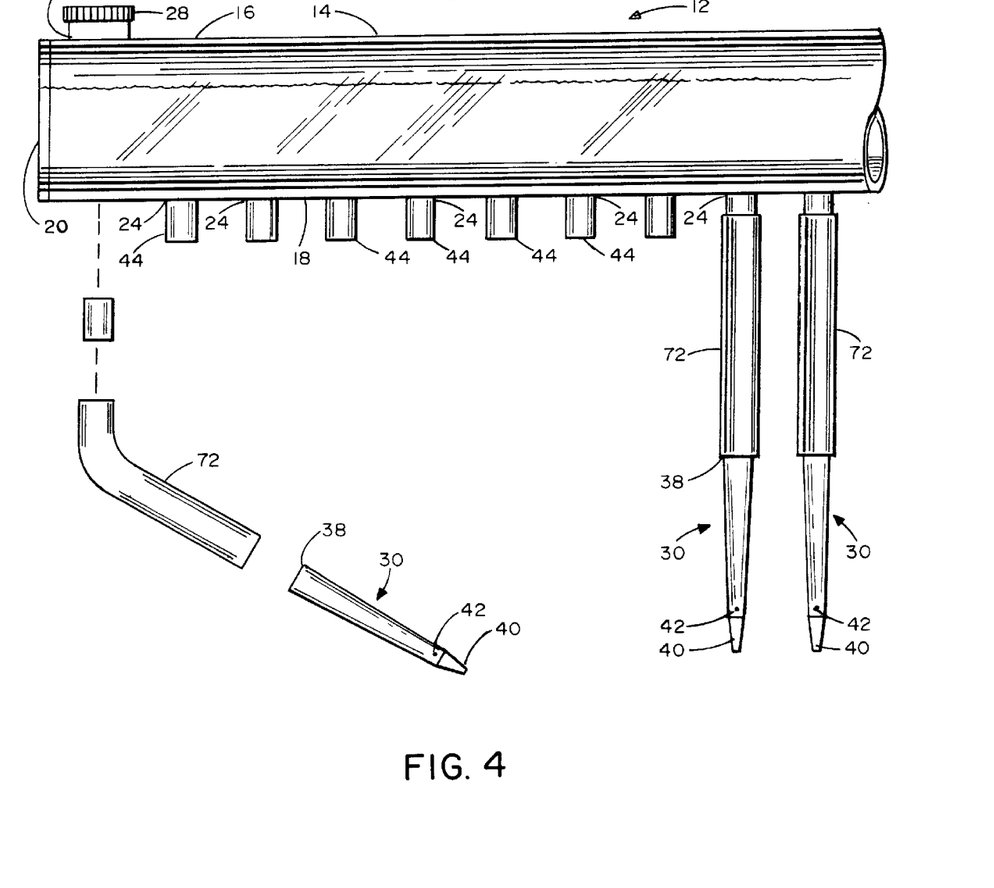
FIG. 4 is a side view of the plant watering system showing a larger transparent tubing with a plurality of extension members and short hoses attached to the extension members for connecting a plurality of plant watering devices.
Figure 5:
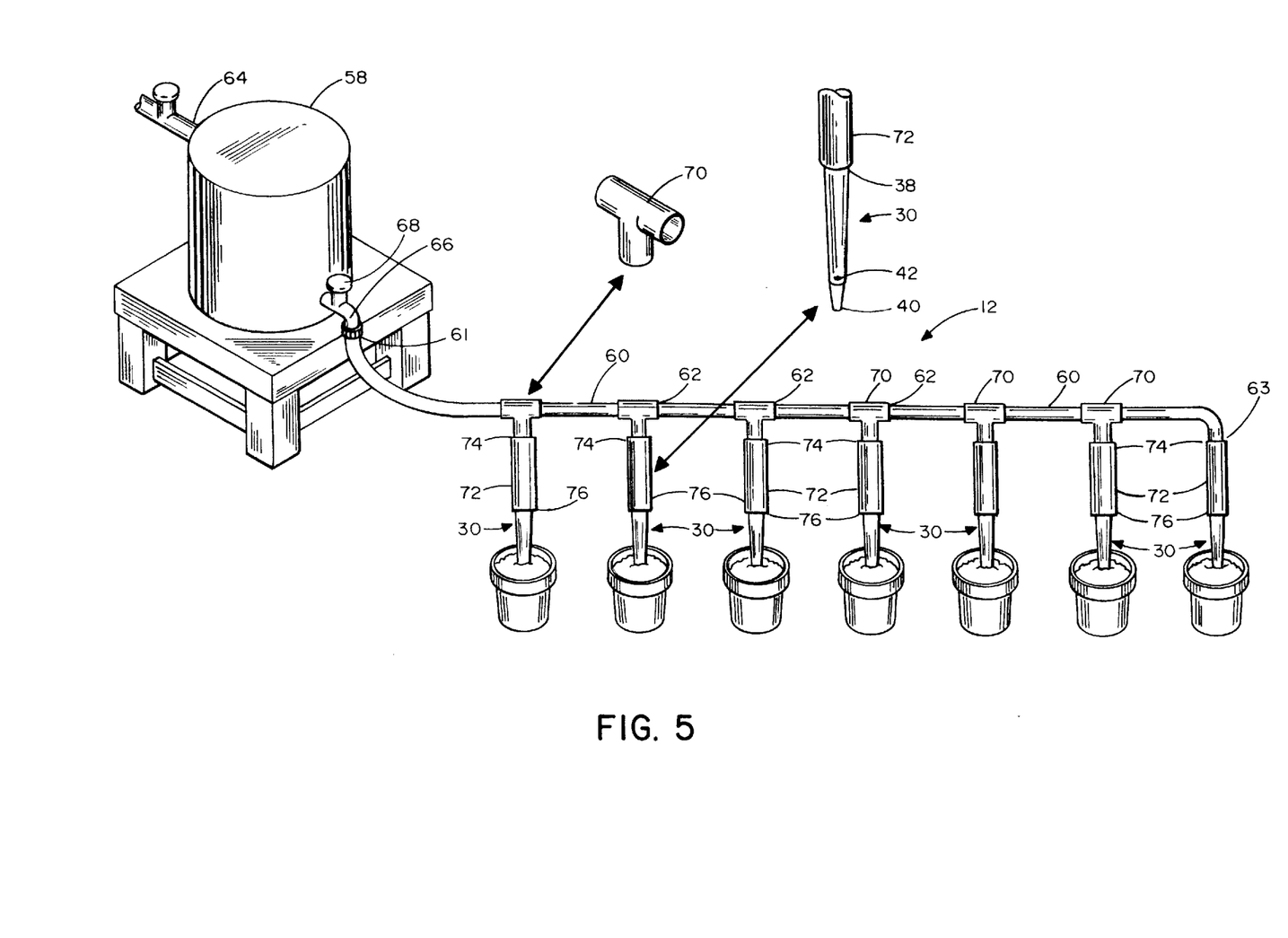
FIG. 5 is a perspective view of an alternative embodiment of the plant watering system including a water drum with an on/off valve, tubing with a plurality of openings and T-shaped fittings at each opening for attaching a short hose which is connected to the plant watering device and showing the devices inserted into a plurality of potted plants.

FIGS. 3–7 show alternative preferred embodiments of the subject invention utilizing an improved plant watering device in a plant watering system. Referring to FIGS. 3–5, a self-regulating plant watering system is designated generally by the reference numeral 12 and provides an automatic, controlled delivery of liquid, such as water, fertilizer and insecticides, to the root systems of a plurality of plants on a substantially continuous basis. The self-regulating plant watering system 12 is easily assembled and readily utilized for automatically watering a plurality of plants on an as needed basis.

In the preferred embodiment, the plant watering system 12 includes an elongated chamber 14, such as, by way of example, a tubing, which has a predetermined length and includes an upper portion 16, a lower portion 18 and opposite ends 20, 22. The chamber 14 also includes a plurality of openings 24 positioned at spaced apart intervals along the length of the lower portion 18 of the chamber 14. The upper portion 16 includes an entrance 26 which has a closeable means, such as a threaded fill cap 28 as shown in FIGS. 3 and 4, for receiving liquid into the chamber 14 and then sealing the entrance 26. The plant watering system 12 also includes a plurality of improved plant watering devices 30 which are designed to be attached to the chamber 14. Each device 30 includes an elongated, hollow body 32 which has an upper portion 34 and a lower portion 36. The upper portion 34 of the body 32 has an open top end 38 and the lower portion 36 has a closed, tapered bottom end 40 for insertion into the soil (see FIGS. 6 and 7). The closed, tapered bottom end 40 includes at least one through hole 42 near the bottom end. When the lower portion 36 is inserted into the soil, the through hole 42 allows for controlled release of liquid from the device 30 directly into the soil. In the preferred embodiment, the device includes two through holes 42 opposite from one another near the bottom end 40 which have a diameter not larger than 7/64 inches.

Figure 6:
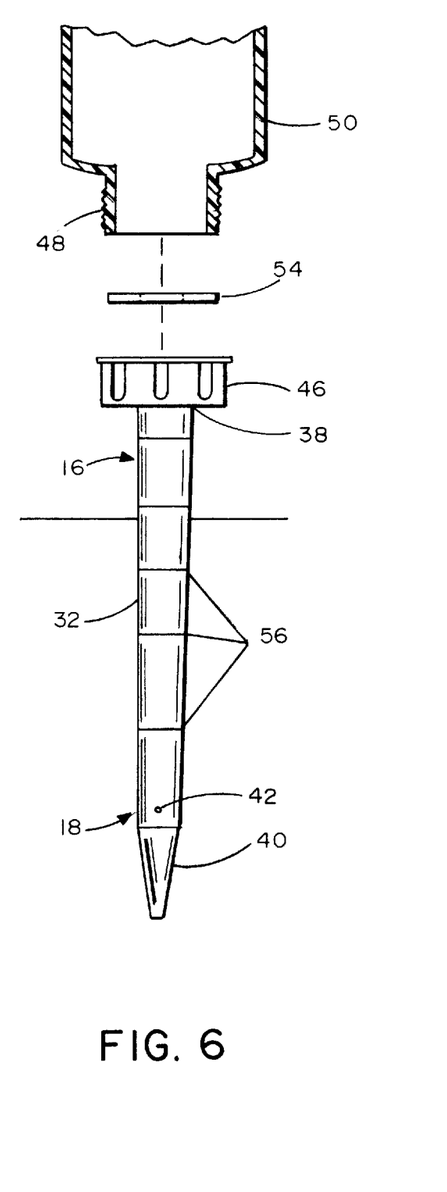
FIG. 6 is a side view of the improved plant watering device showing a portion of a container having a threaded mouth, the threaded endcap of the device for attachment to the container, a resilient washer which fits within the threaded endcap, the elongated body with a plurality of rings and the tapered bottom end including a through hole.
Figure 7:
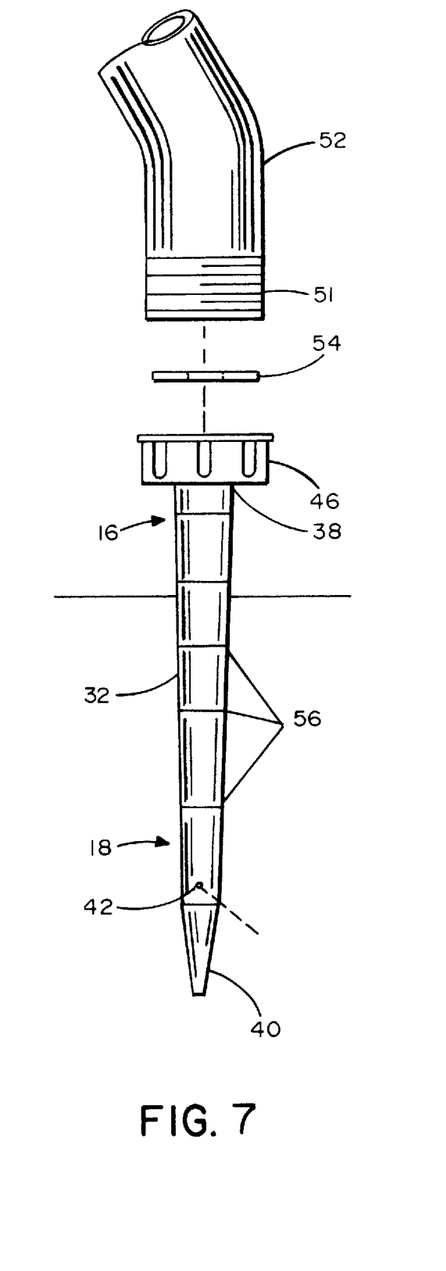
FIG. 7 is a side view of the improved plant watering device showing a portion of a hose having a threaded mouth, the threaded endcap of the device for attachment to the hose, a resilient washer which fits within the threaded endcap, the elongated body with a plurality of rings and the tapered bottom end including a through hole.

In the subject invention, the openings 24 include a means for attaching the watering devices 30 to the chamber 14 and forming an airtight connection between each device 30 and the chamber 14. As shown in FIGS. 3 and 4, an extension member 44 extends downward from each opening 24 and is adapted for connection with the top end 38 of each improved watering device 30. In the preferred embodiment, each extension member 44 includes external threads 45 for securely attaching the watering devices 30 to the extension member 44 in an airtight connection. The improved plant watering device 30 includes an internally threaded endcap 46 which threads correspond to the external threads 45 of the extension member 44 for screwing the device 30 onto each member 44 and forming an airtight connection between the endcap 46 and the extension member 44. The subject invention may also include threaded closure caps for covering and sealing extension members 44 which are not being used. As shown in FIGS. 6 and 7, the threaded endcap 46 of the improved plant watering device 30 is designed to also correspond to the threaded mouth 48 of a container 50, such as a typical plastic bottle, or a threaded mouth 51 of a hose 52. Because the threaded endcap 46 is tightly screwed on the bottle or hose, an airtight connection is formed.

In addition, the preferred embodiment of the improved plant watering device 30 includes a resilient washer 54 which is positioned within the threaded endcap 46 at the top end 38 for ensuring an airtight fit between the endcap 48 and the extension member 44, container 50, hose 52 or the like (see FIGS. 6 and 7). The resilient washer 54 is a feature of the subject invention and is preferably constructed of a soft, pliable material, such as by way of example, a rubber material. Further, the improved plant watering device 30 may include a plurality of markings or rings 56 on the exterior of the body 32 of the device 30, spaced at a suitable distance apart. In the preferred embodiment, the rings 56 are one inch apart. Depending on the soil depth and size of the plant, the user may adjust the length of the plant watering device 30 by cutting the device at one of the rings 56. After cutting the device at one of the rings 56, the threaded endcap 46 is simply pushed in place at the cut end of the body 32 of the device 30.

In use, the improved plant watering devices 30 are screwed into place on each of the extension members 44 and the lower portions 36 of the devices are inserted to a desired depth into the soil of the plants. The threaded fill cap 28 is removed from the chamber 14 and the chamber and devices 30 are filled with water. Once the chamber 14 and devices 30 are full and the threaded fill cap 28 is tightly secured, a partial vacuum is created within the chamber 14. As the soil dries and the plants use the water, air bubbles travel up through the through holes 42 near the bottom ends 40 of the devices 30, through the devices 30 and into the chamber 14. When the air bubbles enter the chamber 14, the partial vacuum is broken and more water is forced out through the through holes 42. This process repeatedly occurs in each watering device 30 until the chamber 14 is empty and must be refilled with water.

In the preferred embodiment, the chamber 14 is a lightweight sturdy tubing with sealed opposite ends 20, 22 which may be manufactured in a variety of lengths and diameters depending on the intended use of a particular watering system 12. For example, a three inch plastic tubing may be used for a flower box, such as a typical flower box ranging in size from thirty inches to forty-eight inches in length. For situations requiring a larger capacity of stored water, such as transportation of numerous plants, a four to six inch tubing may be used. The number of openings 24 and corresponding number of plant watering devices 30 may be varied depending on the number of plants to be watered by the system.

In the preferred embodiment, the tubing or chamber 14 and watering devices 30 are constructed of a substantially rigid plastic to prevent air pressure from collapsing the tubing and for providing a watering device which is easily pushed partially into the ground and extends vertically upward. The plastic tubing or chamber 14 is preferably a clear or transparent plastic so that the amount of water remaining in the chamber 14 is readily determined and can be replenished when depleted.

Another alternative embodiment of the plant watering system 12 for providing liquid on a long term basis to a plurality of plants in an exterior setting, such as a garden, is shown in FIG. 5. The plant watering system includes a large water container or drum 58, for example drums ranging in size from five to fifty gallons, and a tubing or line 60 attached to the container 58. The line 60 has opposite ends 61, 63 and includes a plurality of openings 62 for attaching a plurality of plant watering devices 30. The drum 58 is positioned slightly elevated above the level of the line 60 such that the effects of gravity are exerted on the water column stored in the drum 58. The drum 58 includes an entrance 64, which can be opened and closed, for receiving water into the drum from an outside source and an exit line 66 which is attached to one end 61 of the tubing or line 60 (see FIG. 5). The exit line 66 delivers water stored in the drum 58 to the line 60 and includes a means for opening and closing the line, such as an on/off valve 68, for containing and releasing the liquid in the drum 58 as needed. In this embodiment, the means for attaching the devices 30 to the openings 62 in the line 60 is a T-shaped fitting 70, such as a PVC T, is placed on the line 60 at each opening 62. A short plastic hose 72 having opposite ends 74 and 76 is attached to the T-shaped fitting 70 with one end 74 attached to the bottom of the T-shaped fitting 70 and the other end 76 attached to the top end 38. The top end 38 is adapted to be received into the end 76 of the hose 72 to form a snug fit with the hose 72. The bottom end 40 of the device 30 is inserted into the soil adjacent to the plant.

In use, the plant watering system 12 shown in FIG. 5 provides an enclosed, self-regulating water system operating under a partial vacuum for delivering liquid directly to the root systems of a plurality of plants. With the valve 68 in the closed position and the entrance 64 opened, the drum 58 is filled with water and a partial vacuum is created once the entrance 64 is sealed. The valve 68 is then opened and the line 60 and plant watering devices 30 fill with water and the vacuum is temporarily broken. Once the line 60 and devices 30 are filled with water, the partial vacuum is restored. As the plant uses the water and the soil dries, air bubbles travel up through the through hole 42 in the bottom end 40 of the watering device 30, through the line 60 and into the drum 58. When the air bubbles enter the drum 58, the partial vacuum is broken and more water is forced out through the through holes 42 of the devices 30. This process repeats itself until the drum 58 has to be refilled with water. Thus, the subject invention provides a plant watering system which utilizes an improved plant watering device to provide automatic, controlled delivery of liquid, such as water, fertilizer and insecticides, to the root systems of a plurality of plants on a substantially continuous basis.

While certain preferred embodiments of the invention have been illustrated, it is to be understood that various other modifications and alterations are within the spirit and scope of the invention.

What is claimed is:

1. A self-regulating plant watering system for automatic, controlled delivery of liquids to the root systems of plants and for promoting water conservation, said system comprising:

a. an elongated chamber having a pre-determined length and including an upper portion, a lower portion, opposite ends and a plurality of openings positioned at spaced intervals along the length of the lower portion of said chamber;

b. an entrance having a closeable means for receiving liquid into the chamber and sealing said entrance;

c. a plurality of hollow, elongated watering devices, each device having an open top end, a closed, tapered bottom end and at least one through hole near the bottom end for allowing a controlled release of liquid from the device into the soil;

d. means for attaching said top ends to said openings for attaching said watering devices to said chamber and forming an airtight connection between each device and the chamber; and e. wherein said chamber and attached watering devices define an enclosed apparatus, whereby said chamber and devices are filled with water and a partial vacuum is created within said apparatus.

2. The plant watering system of claim 1, wherein said opposite ends of said chamber are sealed.

3. The plant watering system of claim 2, wherein said attachment means is an extension member extending from each opening, said member adapted for connection with the top end of said watering devices.

4. The plant watering system of claim 3, wherein the top end of each watering device is enlarged for receiving and securing said extension member in said top end.

5. The plant watering system of claim 4, wherein said extension member is externally threaded.

6. The plant watering system of claim 5, wherein said enlarged top end comprises an internally threaded endcap corresponding to the externally threaded extension member for securely attaching said devices to said extension members.

7. The plant watering system of claim 6, each watering device further including a resilient washer positioned in the threaded endcap for ensuring an airtight fit between the top end of each device and said extension member.

8. The plant watering system of claim 5, wherein the length of said device is adjustable for use with different soil depths and different sized plants.

9. The plant watering system of claim 3, said extension member further comprising a hose having opposite ends, one end attached to said extension member and the other end being fitted over the top end of said device.

10. The plant watering system of claim 3, wherein said closeable means is a threaded fill cap on the upper portion of said chamber.

11. The plant watering system of claim 3, wherein said chamber is tubing constructed of a lightweight, sturdy material.

12. The plant watering system of claim 11, wherein said material is a substantially rigid plastic.

13. The plant watering system of claim 12, wherein said plastic is transparent.

14. The plant watering system of claim 1, wherein said elongated chamber is tubing and further comprising an airtight container for storing liquid, said container including an exit for releasing liquid stored in said container into said tubing and an entrance for receiving liquid into said container from an external source, wherein said exit is connected to one end of said tubing and includes a means for opening and closing said exit for containing and releasing liquid from the container into said tubing.

15. The plant watering system of claim 14, wherein said container is elevated above the height of said tubing.

16. The plant watering system of claim 14, wherein said attachment means comprises a hollow, T-shaped fitting including a top, horizontal portion having opposite ends and a vertical portion extending downward from the top portion, said vertical portion having an open, bottom end.

17. The plant watering system of claim 16, said attachment means further comprising a hose having opposite ends, wherein one end is attached to said bottom end of said T-shaped fitting and the other end is fitted over the top end of said watering device for connecting said tube to said plurality of watering devices for delivering liquid through the tube and watering devices to plants.

18. The plant watering system of claim 16, wherein said T-shaped fitting is a PVC T.

19. The plant watering system of claim 14, wherein said means for opening and closing said exit is an on/off valve.

20. The plant watering system of claim 14, wherein said tubing is constructed of a lightweight, sturdy material.

21. The plant watering system of claim 20, wherein said material is transparent.

* * * * *